United States Patent Office 3,069,247
Patented Dec. 18, 1962

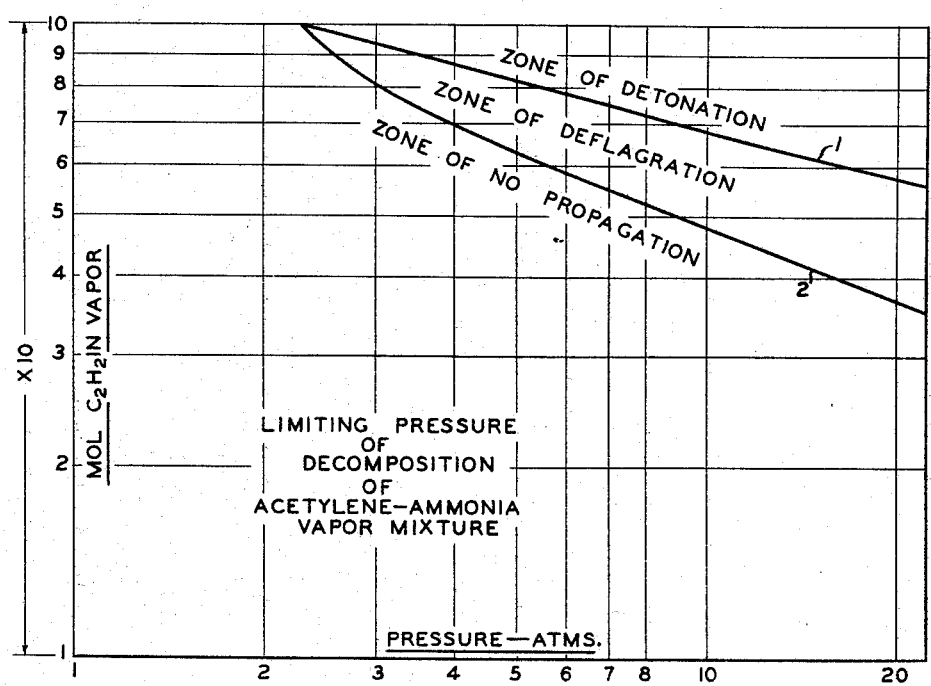

3,069,247
METHOD FOR HANDLING ACETYLENE
Martin J. Barry, Westport, Conn., assignor to The M. W. Kellogg Company, Jersey City, N.J., a corporation of Delaware
Filed Feb. 5, 1959, Ser. No. 791,408
6 Claims. (Cl. 48—190)

This invention relates to a method for handling acetylene and particularly to a method for maintaining acetylene under pressure. In one of its more particular aspects, this invention relates to a method for pipe-line transportation and storage of acetylene.

As a chemical intermediate, acetylene is extremely versatile. It is used industrially for the preparation of chlorinated ethylenes, acetic acid, vinyl chloride, vinyl acetate, neoprene, chloroprene and acrylonitrile. With each new process development in the synthetic chemical industry, the importance of acetylene as a starting material increases.

Despite the versatility of acetylene, its use is somewhat limited by the hazards involved in handling it because acetylene by itself can explode by decomposition reactions at elevated pressures. (For example, some safety codes prohibit the handling of pure acetylene at pressures in excess of 9 p.s.i.g.) This possibility of explosion at slightly elevated pressures has precluded transportation by pipe-line and storage in any significant quantities. Since acetylene is not transported by pipeline, location of the production facility is invariably tied to the process in which it is to be used. Because it cannot be stored (except, of course, for the limited storage of solutions of acetylene in acetone in pressure cylinders), preparation is usually on a demand basis.

It is an object of this invention to provide a means for maintaining acetylene under pressure without an explosion hazard.

It is another object of this invention to provide a means for pipe-line transportation of acetylene.

It is another object of this invention to provide a means for safely storing acetylene under pressure.

Various other objects and advantages will become apparent from the following description and disclosure.

According to the process of this invention, acetylene can be handled safely under pressure by maintaining it in admixture with ammonia vapor. The mol concentration of acetylene in the ammonia-acetylene mixture depends on pressure, i.e., at high pressures, low concentrations of acetylene are employed. The relationship between acetylene concentration and pressure is shown in the accompanying figure of the drawing which contains two lines, numbered 1 and 2. Line 1 may be represented by the equation:

$$Y = \frac{118}{X^{0.2414}}$$

in which Y equals mol percent acetylene in the acetylene-ammonia mixture and X equals pressure in atmospheres. Line 2 may be represented by the equation:

$$Y' = \frac{110}{(X' - 1.0)^{0.374}}$$

in which Y' equals mol percent acetylene and X' equals pressure in atmospheres. A concentration of acetylene in excess of the value Y for a given pressure X in Equation 1, i.e., a concentration falling in the zone above line 1 and identified as the zone of detonaton will be likely, when subjected to shock, to produce a high velocity or explosive reaction. A mixture of acetylene and ammonia which exceeds the value Y' in Equation 2 at a given pressure X' but does not exceed the value Y in Equation 1, i.e., a concentration of acetylene falling in the zone between lines 1 and 2 and identified as the zone of deflagration may react when subjected to shock but will not produce a high velocity reaction or explosion. A concentration of acetylene below Y' in Equation 2 for a given pressure X', i.e., a concentration falling in the zone below line 2 and identified as the zone of no propagation will not react or explode when subjected to shock. Hence, acetylene concentrations are preferably maintained below the value Y' in Equation 2, i.e., below line 2 on the drawing. This will also provide a margin of safety since concentrations may fall above line 2, i.e., exceed the value Y' in Equation 2 without danger of explosion provided that concentrations determined by Equation 1 are not exceeded. Reference to the figure of the drawing and Equations 1 and 2 indicates that acetylene can be handled safely over relatively wide pressure ranges using the process of this invention. However, reference to the drawing also indicates that, as the pressure is increased, the concentration of acetylene must be decreased. Hence, although high pressures are ordinarily preferred for the storage and transportation of gases, any advantage obtained by using high pressures with acetylene-ammonia mixture is somewhat off-set by the necessity for reducing the acetylene concentration as the pressure increases. Therefore, in the process of this invention low pressures which can extend up to about 20 atmospheres are preferred.

While acetylene can be safely transported and stored by maintaining it in admixture with ammonia, it is not suitable for use in this form. Prior to use, therefore, the ammonia must be removed and this can be accomplished by any convenient method. A particularly advantageous method, because of its simplicity, involves absorption of the ammonia in water. For this purpose, the acetylene-ammonia vapor mixture is introduced into the bottom of a scrubbing tower in which it is countercurrently contacted with water. The amount of water will, of course, vary depending on the amount of ammonia to be absorbed. After scrubbing with water, the acetylene is dried and is then ready for use.

The following examples are presented in order to illustrate the process of this invention.

EXAMPLE I

An acetylene plant of approximately 2000 pounds per day capacity is set-up approximately three-quarters of a mile distance from a plant producing acrylonitrile and requiring acetylene. Utilizing the process of this invention, 36 mol percent acetylene is maintained in admixture with 64 mol percent ammonia. The admixture is compressed to 20 atmospheres for pipe-line transportation through a 2 inch I.D. pipe to the plant. Prior to use, the ammonia is removed from the acetylene by countercurrent contact with water. After water treatment, the acetylene is dried and is ready for use.

In order to avoid shut-down, provision is made for storing excess acetylene. In this connection storage tanks of 7,350 cubic feet capacity (15 feet x 40 feet) are employed and the acetylene is stored at 20 atmospheres in admixture with ammonia (34 volume percent acetylene; 66 volume percent ammonia). The 36 volume percent of acetylene provides a total of 2800 pounds of acetylene in each tank or a usable reserve of about 2500 pounds.

The following example presents the results of tests on mixtures of acetylene and ammonia at approximately 20 atmospheres.

EXAMPLE II

In this test a shot tube 105.5 foot long and of exactly 4 inch diameter (I.D.) was employed. The shot tube was fitted with ionization stages to detect flames and detonation waves and measure their velocity and a pressure gauge (a "dynagage" DG-101) in the far end of the tube. Ignition in each test was attained by exploding a 0.010 inch diameter, 4 cm. long tungsten wire wound in 4 turns in a helex of ⅛ inch diameter with 1 cm. between electrodes. The firing of this resistance wire is by means of a 96 microfarad condenser charged to 2000 volts and fired through a BT-83-hydrogen thyratron tube. The explosion of the ignition wire produces no detectable pressure changes when fired into an inert gas at 335 p.s.i.g.

Prior to the test, the shot tube was flushed several times with anhydrous ammonia after which the predetermined amount of ammonia was weighed into the tube at 13–14° C. Acetylene was then run into the tube through an activated charcoal filter until the predetermined partial pressure of acetylene was reached. After filling, the tube was heated to the tabulated temperature and the ignition wire was exploded as described above. Readings on the pressure gauge and other detection equipment were noted. In those instances where no reaction took place, as indicated by the detection equipment, the observation was confirmed by chemical analysis. (Although storage and pipeline transportation obviously implies ambient temperatures, and while ambient temperatures will usually be used, it will be seen from the table that somewhat elevated temperatures up to about 100° C. can be tolerated.) Results of these tests are summarized in the table below.

*Table I*

| Composition, Mol Percent | | Temperature, °C. | Pressure, p.s.i.a. | Results |
|---|---|---|---|---|
| Acetylene | Ammonia | | | |
| 48 | 52 | 43 | 349 | Detonation. |
| 43 | 57 | 57 | 340 | Reacted. |
| 41 | 59 | 58 | 349 | Do. |
| 38 | 62 | 48 | 347 | Do. |
| 37 | 63 | 60 | 324 | Do. |
| 36 | 64 | 80 | 342 | Do. |
| 35 | 65 | 56 | 350 | Do. |
| 36 | 64 | 63 | 351 | No Reaction. |
| 33 | 67 | 62 | 352 | Do. |
| 32 | 68 | 60 | 357 | Do. |
| 30 | 70 | 62 | 356 | Do. |
| 28 | 72 | 68 | 350 | Do. |
| 24 | 76 | 65 | 351 | Do. |
| 23 | 77 | 69 | 320 | Do. |
| 21 | 79 | 67 | 290 | Do. |

Having thus provided a description of this invention by reference to a specific example thereof, it should be understood that no undue limitations or restrictions are to be imposed by reason thereof, but that the scope of this invention is defined by the appended claims.

Having thus described my invention, I claim:

1. A process for handling acetylene under pressure which comprises: maintaining acetylene at an acetylene partial pressure above 9 p.s.i.g. in admixture with ammonia vapor at a temperature below about 100° C., the mol concentration of acetylene being correlated to pressure and not exceeding the value of Y in the equation $$Y = \frac{118}{X^{0.2414}}$$

in which Y equals the mol percent of acetylene and X equals total pressure in atmospheres, the concentration of ammonia providing substantially the balance.

2. A process for handling acetylene under pressure which comprises: maintaining acetylene at an acetylene partial pressure above 9 p.s.i.g. in admixture with ammonia vapor at a temperature below about 100° C., the mol concentration of acetylene being correlated to pressure and not exceeding the value of Y' in the equation $$Y' = \frac{110}{(X' - 1.0)^{0.374}}$$

in which Y' equals the mol percent of acetylene and X' equals total pressure in atmospheres, the concentration of ammonia providing substantially the balance.

3. The process of claim 2 in which the acetylene is separated from the admixture by water washing.

4. A process for the pipe line transmission of acetylene under pressure which comprises: maintaining acetylene at an acetylene partial pressure above 9 p.s.i.g. in admixture with ammonia vapor at a temperature below about 100° C., in a mol concentration at the prevailing total pressure below the lowest concentration at that total pressure falling within the zone of detonation on the figure of the drawing, the concentration of ammonia providing substantially the balance.

5. A process for the pipe line transmission of acetylene under pressure which comprises: maintaining acetylene at an acetylene partial pressure above 9 p.s.i.g. in admixture with ammonia vapor at a temperature below about 100° C., the mol concentration of acetylene being correlated to the prevailing total pressure and being maintained below the lowest concentration at that total pressure falling within the zone of deflagration on the figure of the drawing, the concentration of ammonia providing substantially the balance.

6. A process for the pipe line transmission of acetylene under pressure which comprises admixing acetylene and ammonia vapor, compressing said admixture to an elevated total pressure not higher than about 20 atmospheres, the mol concentration of acetylene in said compressed admixture being sufficient to provide an acetylene partial pressure above 9 p.s.i.g. and being correlated to said total pressure and not exceeding the value of Y' in the equation $$Y' = \frac{110}{(X' - 1.0)^{0.375}}$$

in which Y' equals the mol percent of acetylene and X' equals total pressure in atmospheres, the concentration of ammonia providing substantially the balance of said compressed admixture, passing said compressed admixture by pipe line to point of use, reducing the pressure of said admixture to a value such that the partial pressure of acetylene is not greater than 9 p.s.i.g. and washing said admixture at said reduced pressure with water to absorb ammonia.

References Cited in the file of this patent

FOREIGN PATENTS 377,193     Great Britain _____ July 18, 1932